US006685160B2

(12) United States Patent
Shinogle et al.

(10) Patent No.: US 6,685,160 B2

(45) Date of Patent: Feb. 3, 2004

(54) DUAL SOLENOID LATCHING ACTUATOR AND METHOD OF USING SAME

(75) Inventors: Ronald D. Shinogle, Peoria, IL (US); Alan R. Stockner, Metamora, IL (US)

(73) Assignee: Caterpillar Inc, Peoria, IL (US)

(*) Notice: Subject to any disclaimer, the term of this patent is extended or adjusted under 35 U.S.C. 154(b) by 117 days.

(21) Appl. No.: 09/918,101

(22) Filed: Jul. 30, 2001

(65) Prior Publication Data

US 2003/0019948 A1 Jan. 30, 2003

(51) Int. Cl.7 ........................................ F16K 31/02

(52) U.S. Cl. ........................................ 251/129.1; 239/96

(58) Field of Search ........................ 251/129.1; 239/88, 239/89, 90, 91, 92, 93, 94, 95, 96, 585.1, 585.2, 585.3, 585.4, 585.5; 123/490, 499; 335/268

(56) References Cited

U.S. PATENT DOCUMENTS

| | | | | |
|---|---|---|---|---|
| 3,481,542 A | | 12/1969 | Huber | |
| 3,743,898 A | | 7/1973 | Sturman | |
| 4,295,453 A | | 10/1981 | Seilly et al. | |
| 4,964,571 A | | 10/1990 | Taue et al. | |
| 5,141,164 A | | 8/1992 | Ohno et al. | |
| 5,339,777 A | * | 8/1994 | Cannon | 123/90.12 |
| 5,407,131 A | | 4/1995 | Maley et al. | |
| 5,460,329 A | * | 10/1995 | Sturman | 239/96 |
| 5,463,996 A | | 11/1995 | Maley et al. | |
| 5,479,901 A | | 1/1996 | Gibson et al. | |
| 5,488,340 A | | 1/1996 | Maley et al. | |
| 5,494,219 A | | 2/1996 | Maley et al. | |
| 5,597,118 A | | 1/1997 | Carter, Jr. et al. | |
| 5,638,781 A | | 6/1997 | Sturman | |
| 5,640,987 A | | 6/1997 | Sturman | |
| 5,644,280 A | | 7/1997 | Wilson et al. | |
| 5,711,347 A | | 1/1998 | Sturman et al. | |
| 5,713,316 A | | 2/1998 | Sturman | |
| 5,720,261 A | | 2/1998 | Sturman et al. | |
| 5,752,308 A | | 5/1998 | Maley et al. | |
| 6,113,014 A | | 9/2000 | Coldren et al. | |

* cited by examiner

*Primary Examiner*—Edward K. Look
*Assistant Examiner*—John K Fristoe, Jr.
(74) *Attorney, Agent, or Firm*—Liell & McNeil

(57) ABSTRACT

A dual solenoid latching actuator is disclosed and provides an electrical circuit that includes at least one current restrictor, which are preferably a first diode and a second diode. The at least one current restrictor is positioned and arranged such that current flowing in a first direction can energize only one of a first solenoid coil and a second solenoid coil and current flowing in a second direction can energize only the other solenoid coil.

20 Claims, 4 Drawing Sheets

DUAL SOLENOID LATCHING ACTUATOR AND METHOD OF USING SAME

TECHNICAL FIELD

This invention relates generally to valve assemblies, and more particularly to valve assemblies including a first electrical actuator and a second electrical actuator.

BACKGROUND

Hydraulically actuated devices, such as fuel injectors, typically utilize internally mounted, movable valve members to control the flow of actuation fluid to one or more device components. For instance, a number of hydraulically actuated fuel injectors include a movable spool valve that acts as a flow control valve that controls the flow of actuation fluid to the top of an intensifier piston. However, when valves such as these are moved by hydraulic forces, there tends to be a lag time between exposure of the control hydraulic surface to the force and movement of the valve. Engineers have learned that a more abrupt start and end to injection events is preferable. Therefore, there is room for improvement in this field.

One solution that has proven successful is the use of a latching actuator valve to control fluid flow within the injector. One example of this type of valve is described in U.S. Pat. No. 3,743,898, entitled Latching Actuators, which issued to Sturman on Jul. 3, 1973. The latching actuator taught by Sturman includes a first solenoid coil and a second solenoid coil that are selectively actuated to move the valve member between a first, latched position adjacent the first coil and a second, latched position adjacent the second coil. While this solution appears satisfactory in some instances, there is still room for improvement. For instance, in an actuator such as this, the valve member is moved between its first and second positions by sending an magnetizing current to one of the solenoids while a demagnetizing current is sent to the other solenoid. Continued actuation of both coils, if not needed, can result in wasted power by the fuel injection system.

In addition, attempts have been made to improve upon this invention. For instance, U.S. Pat. No. 5,720,261, entitled Valve Controller Systems and Methods and Fuel Injection Systems Utilizing the Same, which issued to Sturman et al. on Feb. 24, 1998 illustrates one such purported improvement. In Sturman et al., a latching actuator is disclosed which also includes an armature movable between a first and second solenoid coil. The disclosed actuator includes two communication lines connecting each coil to the positive and negative terminals of the electronic control module. In other words, a total of four wires are needed for this actuator. However, engineers have also learned that a reduction in the number of fuel injection system components, especially electrical components, can lead to a more robust system.

The present invention is directed to overcoming one or more of the problems as set forth above.

SUMMARY OF THE INVENTION

In one aspect of the present invention, an actuator includes a body. A first solenoid coil and a second solenoid coil are attached to the body. An armature is movable between a first position adjacent the first solenoid coil and a second position adjacent the second solenoid coil. An electrical circuit is electrically connected to the first solenoid coil and the second solenoid coil. The electrical circuit includes at least one current restrictor that is positioned and arranged such that current flowing in a first direction energizes only one of the first solenoid coil and the second solenoid coil and current flowing in a second direction energizes only an other of the first solenoid coil and the second solenoid coil.

In another aspect of the present invention, a valve includes a valve body. A first solenoid coil and a second solenoid coil are attached to the valve body. An armature is movable between the first solenoid coil and the second solenoid coil. A valve member is movably positioned in the valve body and is operably coupled to the armature. An electrical circuit is electrically connected to the first solenoid coil and the second solenoid coil. The electrical circuit includes at least one current restrictor that is positioned and arranged such that current flowing in a first direction can energize only one of the first solenoid coil and the second solenoid coil and current flowing in a second direction can energize only an other of the first solenoid coil and the second solenoid coil. The armature is moved to a first position adjacent the first solenoid coil when the first solenoid coil is energized. The armature is moved to a second position adjacent the second solenoid coil the said second solenoid coil is energized.

In yet another aspect of the present invention, a method of controlling fluid flow includes a step of providing a valve assembly that has a first solenoid coil, a second solenoid coil and a valve member that is operably coupled to an armature. The first solenoid coil and said second solenoid coil are electrically connected to an electrical circuit. The valve member is positioned in a first position, at least in part by energizing one of the first solenoid coil and the second solenoid coil and by limiting energization of an other of the first solenoid coil and the second solenoid coil. The valve member is moved to a second position, at least in part by energizing the other of the first solenoid coil and the second solenoid coil and by limiting energization of the one of the first solenoid coil and the second solenoid coil.

DETAILED DESCRIPTION

Figure 1:
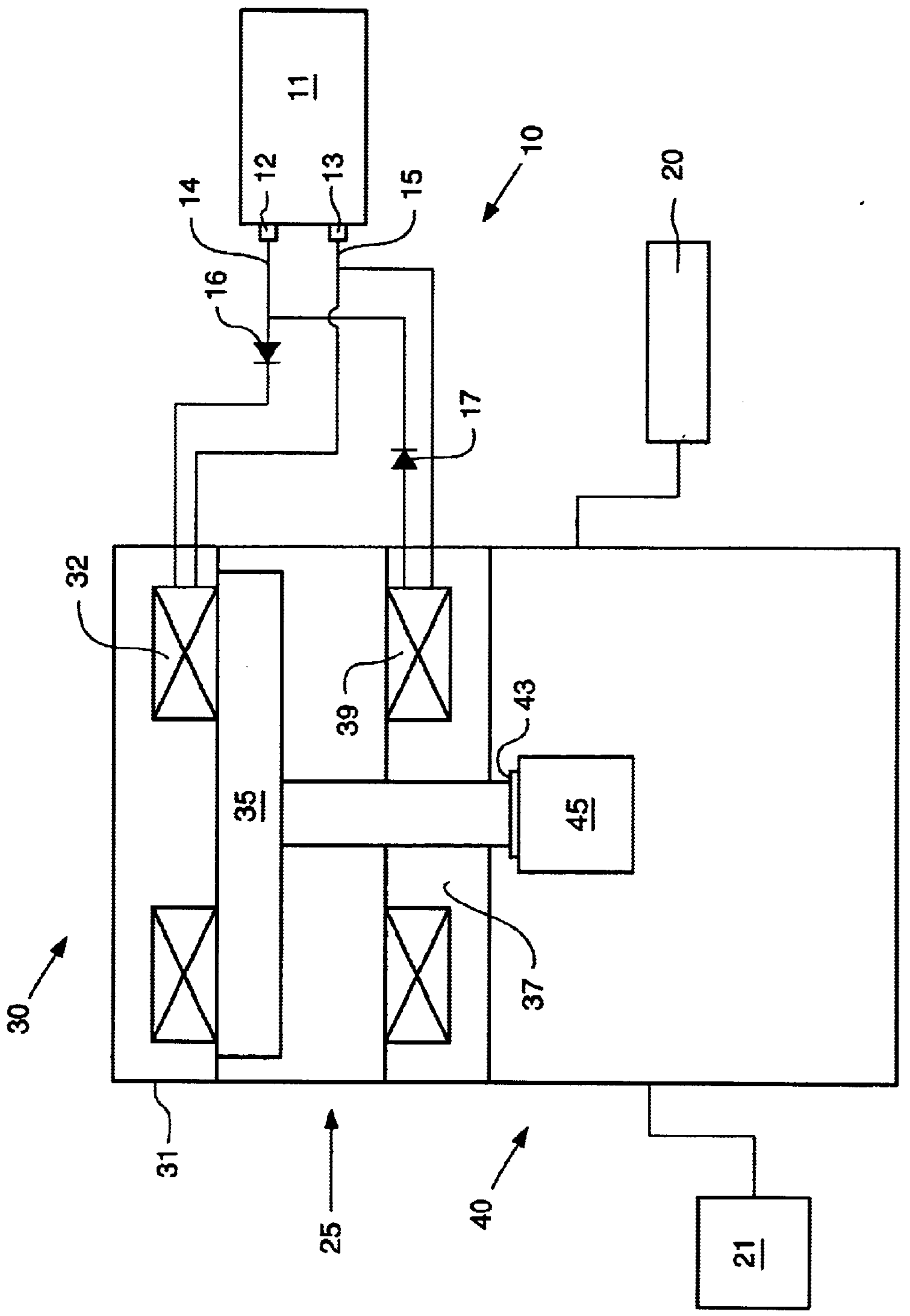
FIG. 1 is a schematic representation of an electrical circuit according to the present invention.

Referring to FIG. 1 there is shown an electrical circuit 10 and a valve 25 according to the present invention. Electrical circuit 10 is electrically connected to an electronic control module 11 that has a positive terminal 12 and a negative terminal 13. Electronic control module 11 is in control communication with a dual solenoid actuator 30. Dual solenoid actuator 30 is preferably attached to a hydraulic device 40 and includes an armature 35 movably positioned between a first solenoid 31 and a second solenoid 37. First solenoid 31 and second solenoid 37 provide a first coil 32 and a second coil 39, respectively, that are arranged in parallel. As illustrated, a first communication line 14 connects both first coil 32 and second coil 39 to positive terminal 12, while a second communication line 15 connects both first coil 32 and second coil 39 to negative terminal 13.

Electrical circuit 10 preferably includes at least one current restrictor positioned between electronic control module 11 and dual solenoid actuator 30. As illustrated, the at least one current restrictor preferably includes a first diode 16 and a second diode 17, both positioned in first communication line 14. First diode 16 is preferably positioned between positive terminal 12 and first coil 32, while second diode 17 is preferably positioned between positive terminal 12 and second coil 39. Second diode 17 is preferably oriented in first communication line 14 in a direction opposite first diode 16. Thus, first diode 16 can prevent the flow of current from negative terminal 13 to first coil 32, while second diode 17 can prevent the flow of current from positive terminal 12 to second coil 39. In other words, first coil 32 will be activated when current flows from positive terminal 12 to negative terminal 13, but will be prevented from activation by first diode 16, which limits the energization of first coil 32, when current flows from negative terminal 13 to positive terminal 12. Likewise, second coil 39 will be activated when current flows from negative terminal 13 to positive terminal 12 but will be prevented from activation by second diode 17, which limits the energization of second coil 39, when current flows from positive terminal 12 to negative terminal 13.

While the current restrictors have been illustrated as first diode 16 and second diode 17, which have been described as steering diodes that block current flow in one direction, it should be appreciated that any device commonly known in the art which merely restricts current flow in one direction could be substituted for each diode. In this instance, a first current restrictor positioned between first coil 32 and positive terminal 12 would restrict the flow of current from negative terminal 13 to first coil 32 to a value below the minimum threshold required to activate first coil 32. Thus, first coil 32 would not be activated when current flows from negative terminal 13 toward first coil 32, without the need to completely block of current flow in that direction. Similarly, a second current restrictor could be positioned between second coil 39 and positive terminal 12 to restrict the flow of current from positive terminal 12 to second coil 39 to a value below the minimum threshold required to activate second coil 39. Second coil 39 would thus not be activated when current flows from positive terminal 12 toward second coil 39, once again without the need to completely block current flow in that direction. Further, those skilled in the art should appreciate that any suitable current restrictor could be included in electrical circuit 10 to sufficiently restrict, or block, current flowing from positive terminal 12 from energizing second coil 39 and to sufficiently restrict, or block, current flowing from negative terminal 13 from energizing first coil 32.

Returning to valve assembly 25, an armature 35 is preferably initially positioned with a zero air gap against one of first solenoid 31 and second solenoid 37. Armature 35 is latched in this first position by residual flux in first coil 32. In other words, when first coil 32 is de-energized, residual magnetism in first coil 32 will provide a small, but sufficient, force which holds armature 35 adjacent first solenoid 37. When second solenoid 37 is energized, the magnetic flux created by second coil 39 will be sufficient to overcome residual flux in first coil 32 and armature 35 will move to a second position latched adjacent second solenoid 37. Once armature 35 has moved to its second position, current to solenoid coil 39 can be ended. Once again, armature 35 will remain in this position due to residual flux in second coil 39. Thus, each coil need only be energized for a sufficient amount of time to move armature 35 to the desired position. Once armature 35 has moved, the respective coil can be de-energized and armature 35 will remain "latched" in that position as a result of residual flux in the adjacent coil.

Preferably, armature 35 is composed of a material that is magnetically soft but structurally hard, such as one percent carbon steel. For instance, as disclosed in U.S. Pat. No. 5,479,901, which issued to Gibson et al. on Jan. 2, 1996, SAE 52100 steel, which is the conventional steel for bearing applications, is suitable for this application because it has sufficient magnetic properties to allow the actuator to be latched by residual magnetism. In addition, the hardness of this steel, which could be achieved by heat treating, makes it a desirable material choice. This is a consideration because mechanical wear on armature 35 can cause the amount of linear displacement of dual solenoid actuator 30 to gradually change over time. Prevention of this wear is particularly advantageous in applications requiring dual solenoid actuator 30 to be actuated frequently, resulting in a high number of actuations over the life of actuator 30. In addition, wear of armature 35 could also lead to small magnetic particles which could contaminate dual solenoid actuator 30 and hinder its performance.

Figure 2:
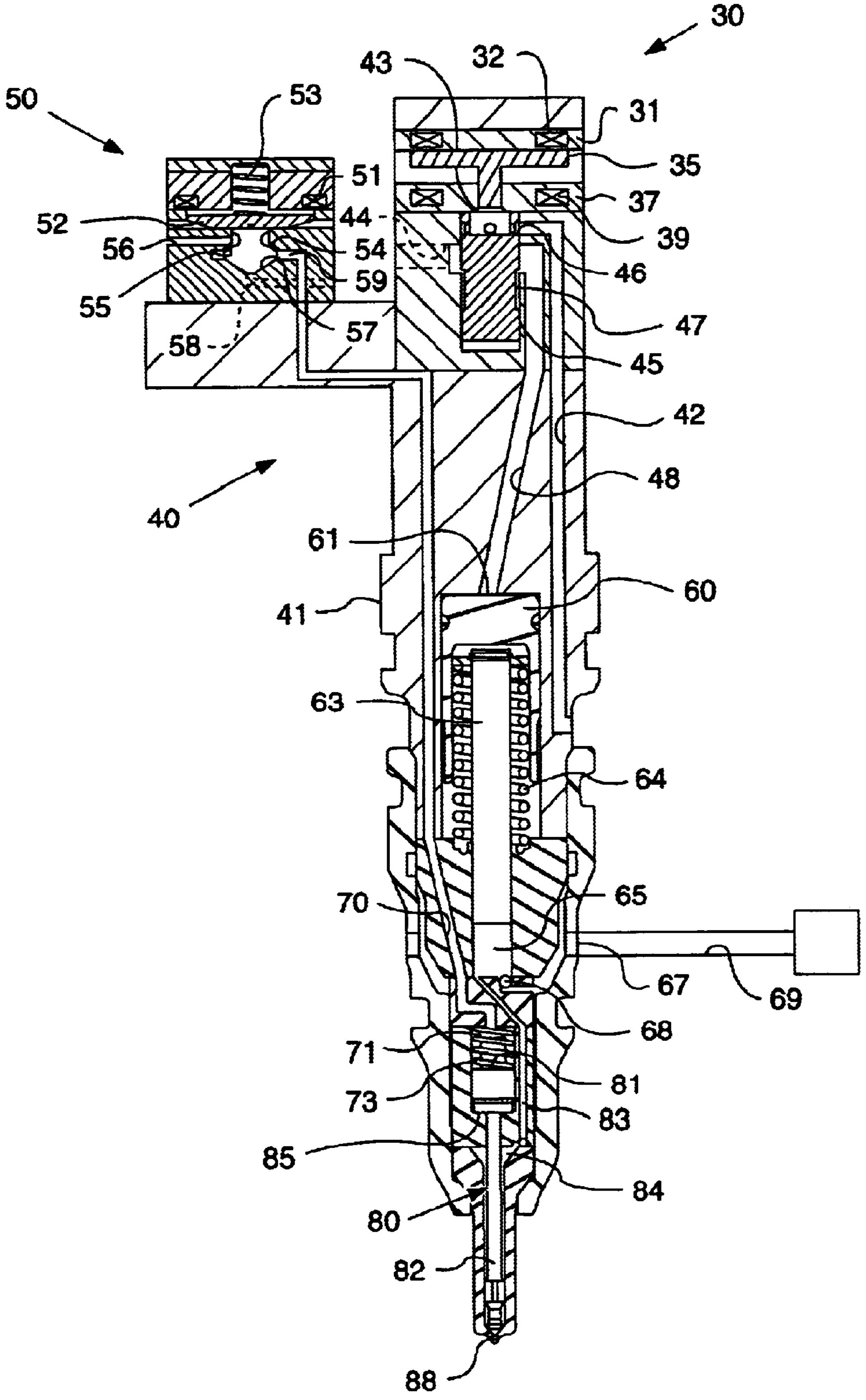
FIG. 2 is a sectioned side diagrammatic view of a hydraulically actuated fuel injector according to the present invention.

Referring in addition to FIG. 2, hydraulic device 40 has been illustrated as a hydraulically actuated fuel injector 40. However, it should be appreciated that other hydraulic devices, such as intake and exhaust valves or engine compression release valves or any other control valve for a hydraulic device, could also benefit from use of the present invention. Fuel injector 40 provides an injector body 41 that contains the various components of fuel injector 40, illustrated as they would be positioned between injection events. Valve assembly 25 is attached to injector body 41 in any conventional manner. A valve member 45 is operably connected to armature 35 via a fastener 43. Preferably, valve member 45 is a spool valve member that is hydraulically balanced with both ends exposed to low pressure as illustrated, however, it should be appreciated that valve member 45 could instead be another suitable valve member, such as a poppet valve member. Spool valve member 45 is movable between a retracted position, as shown, and an advanced position. When spool valve member 45 is in its retracted position, such as when armature 35 is in its first position adjacent first solenoid 31, a low pressure annulus 47 defined by spool valve member 45 opens a low pressure passage 44 to an actuation fluid passage 48. However, when spool valve member 45 is in its advanced position, such as when armature 35 is in its second position adjacent second solenoid 37, a high pressure annulus 46 defined by spool valve member 45 opens a high pressure passage 42 to actuation fluid passage 48. It should be appreciated that because spool valve member 45 is connected to armature 35 by fastener 43, it will move between its retracted and advanced position in a snap action fashion, corresponding to the snap action movement of armature 35.

Also movably positioned in injector body 41 is an intensifier piston 60. Piston 60 provides a hydraulic surface 61 that is exposed to fluid pressure in actuation fluid passage 48. Piston 60 is biased toward a retracted, upward position by a biasing spring 64. However, when pressure within actuation fluid passage 48 is sufficiently high, such as when it is open to high pressure passage 42, piston 60 can move to an advanced, downward position against the action of biasing spring 64. A plunger 63 is also movably positioned in injector body 41 and moves in a corresponding manner with piston 60. When piston 60 is moved toward its advanced position, plunger 63 also advances and acts to pressurize fuel within a fuel pressurization chamber 65 that is connected to a fuel inlet 67 past a check valve 68. Fuel inlet 67 is in fluid communication with a fuel source (not shown) via a fuel supply line 69. During an injection event as plunger 63 moves toward its downward position, check valve 68 is closed and plunger 63 can act to compress fuel within fuel pressurization chamber 65. When plunger 63 is returning to its upward position, fuel is drawn into fuel pressurization chamber 65 past check valve 68. Fuel pressurization chamber 65 is fluidly connected to a nozzle outlet 88 via a nozzle supply passage 83.

A direct control needle valve 80 is positioned in injector body 41 and has a needle valve member 82 that is movable between a first position, in which a nozzle outlet 88 is open, and a downward second position, as shown, in which nozzle outlet 88 is blocked. Needle valve member 82 is mechanically biased toward its downward closed position by a biasing spring 73. Needle valve member 82 has an opening hydraulic surface 85 that is exposed to fluid pressure within a nozzle chamber 84 and a closing hydraulic surface 81 that is exposed to fluid pressure within a needle control chamber 71. A pressure communication passage 70 is in fluid communication with needle control chamber 71 and controls fluid pressure within the same.

Fluid pressure within pressure communication passage 70 is controlled by movement of a pilot valve member 54 positioned in injector body 41. Valve member 54 is movable between a high pressure seat 55 and a low pressure seat 57, and is controlled in its movement by an electrical actuator 50. Actuator 50 is preferably a solenoid 50, as illustrated in FIG. 2, however, it should be appreciated that other suitable actuators, such as a piezoelectric actuator, could be substituted. Solenoid 50 provides a coil 51, a biasing spring 53 and an armature 52 that is connected to valve member 54. When solenoid 50 is de-energized, such as between injection events, valve member 54 is biased to close low pressure seat 57 by biasing spring 53. When valve member 54 is in this position, pressure communication passage 70 is blocked from fluid communication with low pressure passage 58 and fluidly connected to high pressure passage 56. High pressure passage 56 is preferably connected to either high pressure manifold 20 or fuel pressurization chamber 65 via a fluid passage (not shown). High pressure fluid can then act on closing hydraulic surface 81 in needle control chamber 71. When solenoid 50 is activated, such as to begin an injection event, armature 52 pulls valve member 54 upward against the force of biasing spring 53 to open low pressure seat 57 and close high pressure seat 55. Needle control chamber 71 is then fluidly connected to low pressure passage 58 via pressure communication passage 70. While direct control needle valve 80 has been illustrated as being controlled in its movement by hydraulic fluid, such as engine lubricating oil, it should be appreciated that it could instead be controlled by fuel pressure. For instance, pressure communication passage 70 could be alternately fluidly connected to and blocked from fuel pressurization chamber 65 by solenoid 50. Thus, it should be appreciated that fluid control of direct control needle valve 80 could be achieved using a variety of actuation fluids.

Returning to fuel injector 40, closing hydraulic surface 81 and opening hydraulic surface 85 are preferably sized such that even when a valve opening pressure is attained in nozzle chamber 84, needle valve member 82 will not lift open when needle control chamber 71 is fluidly connected to high pressure passage 56 via pressure communication passage 70. In addition, these surfaces are preferably sized such that valve member 82 is move to close under these conditions if it is away from its closed position. However, it should be appreciated that the relative sizes of closing hydraulic surface 81 and opening hydraulic surface 85 and the strength of biasing spring 73 should be such that when closing hydraulic surface 81 is exposed to low pressure in needle control chamber 71, high fuel pressure acting on opening hydraulic surface 85 should be sufficient to move needle valve member 82 upward against the force of biasing spring 73 to open nozzle outlet 88.

Figure 3:
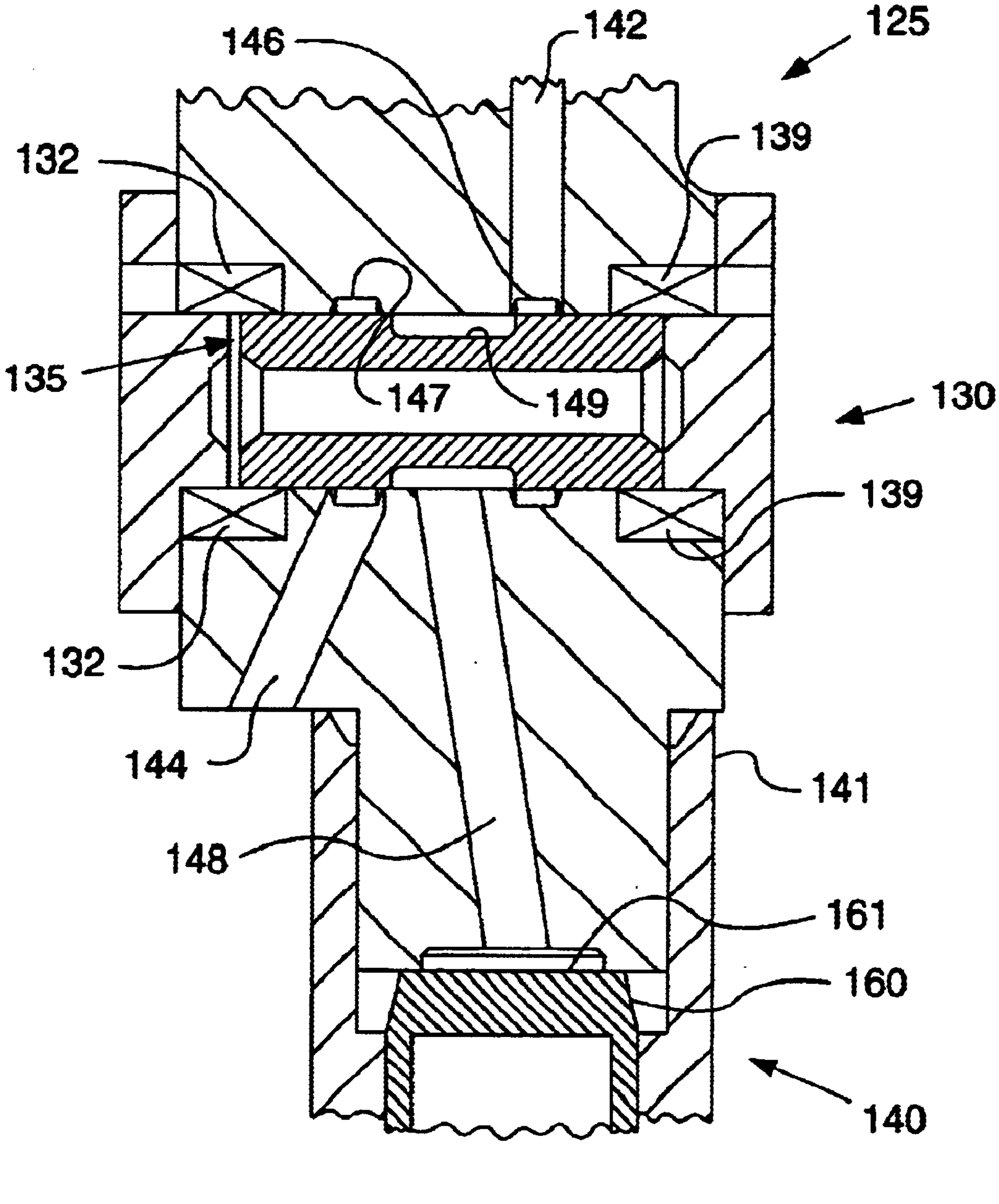
FIG. 3 is a sectioned side diagrammatic view of a dual solenoid latching actuator according to an alternate embodiment of the present invention.

Referring now to FIG. 3 there is illustrated a valve assembly 125 providing a dual solenoid latching actuator 130 according to an alternate embodiment of the present invention. Valve assembly 125 is attached to a fuel injector 140 that is similar to fuel injector 40, illustrated in FIG. 2. In addition, it should be appreciated that valve assembly 125 could be positioned in electrical circuit 10, in place of valve assembly 25, as illustrated in FIG. 1. Therefore, a detailed description of like components will not be included. Dual solenoid latching actuator 130 has a first coil 132 and a second coil 139. An armature 135 is movably positioned between first coil 132 and second coil 139. Armature 135 preferably defines an annulus 149 and can act as a slide valve member that alternatively connects an actuation fluid cavity 148 to a high pressure passage 142 and a low pressure passage 144. When armature 135 is in its first position adjacent first coil 132 actuation fluid cavity 148 is fluidly connected to low pressure passage 144 via a low pressure recess 147 defined by injector body 141. As with the FIGS. 1 and 2 embodiment of the present invention, armature 135 will be moved to this first position when first coil 132 is energized. In addition, armature 135 can move to a second position adjacent second coil 139, as shown, when second coil 139 is energized. When armature 135 is in its second position actuation fluid cavity 148 is fluidly connected to high pressure passage 142 via a high pressure recess 146 and high pressure actuation fluid can act on a hydraulic surface 161 of an intensifier piston 160.

INDUSTRIAL APPLICABILITY

Referring to FIGS. 1–2 and 4, prior to an injection event, low pressure in fuel pressurization chamber 65 prevails. Both first solenoid 31 and second solenoid 37 are de-energized and armature 35 is positioned in its first position adjacent first solenoid 31 and is held in this position by the relatively small, but sufficient, residual flux in first coil 32. Spool valve member 45 is in its retracted position fluidly connecting actuation fluid passage 48 to low pressure passage 44 and piston 60 and plunger 63 are in their retracted, upward positions. Pressure communication passage 70 is fluidly connected to high pressure passage 56 and needle valve member 82 is in its biased position closing nozzle outlet 88.

Just prior to an injection event, current is sent through electrical circuit 10 from negative terminal 13 to positive terminal 12. (See 1, FIG. 4*a*) Second coil 39 is energized, while first coil 32 is prevented from being energized by first diode 16. The magnetic flux created in second coil 39 is sufficient to overcome the relatively small residual flux force of first coil 32 and is sufficient to pull armature 35 to a latched position adjacent second solenoid 37. Armature 35 is moved to this second position in an abrupt, snap action movement. Current to second coil 39 is then ended (See 2, FIG. 4*a*), and armature 35 remains held in this position as a result of residual flux in second coil 39, as well as a lack of biasing force acting on armature 35 and valve member 45. In addition, it should be appreciated that the residual flux can decay over time. Thus, if armature 35 is to remain in this position for an extended amount of time, second coil 39 may need to be briefly energized to reset the system.

When armature 35 is moved to its second position, spool valve member 45 is moved to its advanced position in a corresponding snap action manner. (See 5, FIG. 4*b*) When spool valve member 45 advances, actuation fluid passage 48 becomes blocked from low pressure passage 44 and opened to high pressure passage 43 via high pressure annulus 46. High pressure is now acting on hydraulic surface 61 causing piston 60 and plunger 63 to start moving toward their advanced positions to pressurize fuel in fuel pressurization chamber 65 and nozzle chamber 84. However, because closing hydraulic surface 81 is exposed to high pressure in needle control chamber 71, needle valve member 82 will not be moved to its upward position to open nozzle outlet 88. Further, it should be appreciated that piston 60 and plunger 63 move only a slight distance at this time because of hydraulic locking, which is a result of nozzle outlet 88 remaining closed. However, the slight movement of piston 60 and plunger 63 is still sufficient to raise fuel pressure within fuel pressurization chamber 65 to injection pressure levels.

Just prior to the desired start of injection, solenoid 50 is energized (See 7, FIG. 4*c*) and valve member 54 is pulled to its upward position by armature 52. Needle control chamber 71 is now open to low pressure passage 58 via pressure communication passage 70 and blocked from fluid communication with high pressure passage 56. Because high pressure is no longer acting on closing hydraulic surface 81, the fuel pressure in nozzle chamber 84 is sufficient to overcome the bias of biasing spring 73 and needle valve member 82 moves to its open position to allow fuel spray into the combustion space (See 9, FIG. 4*d*).

When the desired amount of fuel has been injected, solenoid 50 is de-energized (See 8, FIG. 4*c*) and valve member 54 is moved to its downward position closing low pressure seat 57 under the force of biasing spring 53. Needle control chamber 71 is now open to high pressure actuation fluid via pressure communication passage 70. The high pressure acting on closing hydraulic surface 81 is sufficient to move needle valve member 82 downward to close nozzle outlet 88 and end injection (See 10, FIG. 4*d*). Because of hydraulic locking, piston 60 and plunger 63 stop their advancing movement, but do not immediately begin to retract because of high pressure acting on hydraulic surface 61.

Figure 4A:
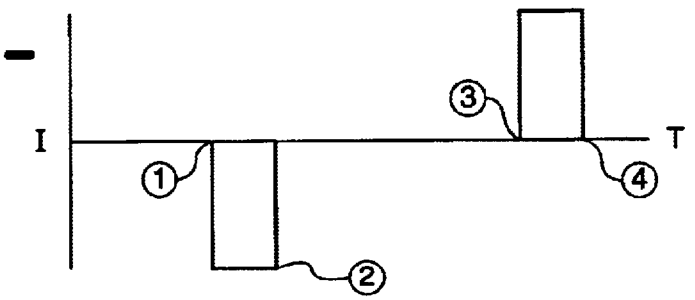
FIGS. 4*a–d* show circuit current to the dual solenoid actuator, valve member position, current to the needle valve actuator and needle valve member position versus time over an injection event for the fuel injector of FIG. 2.
Figure 4B:
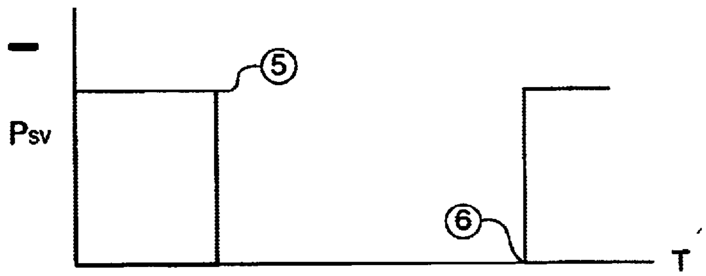
Figure 4C:
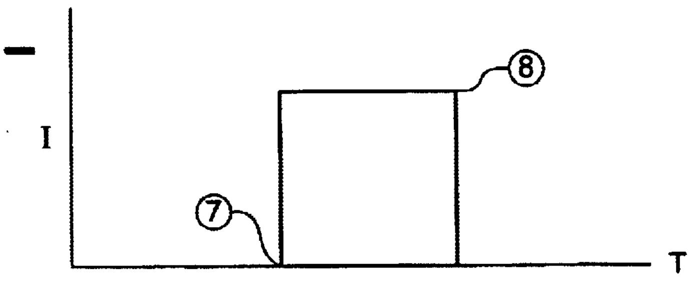
Figure 4D:
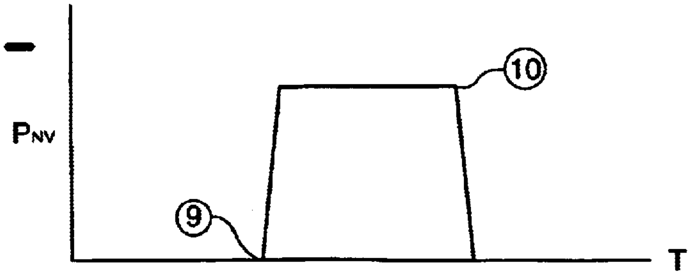

First coil 32 is then energized by current flow from positive terminal 12 to negative terminal 13 (See 3, FIG. 4*a*). The magnetic flux created in first coil 32 overcomes the residual flux in second coil 39, and armature 35 is pulled to its first position adjacent first solenoid 31. Current is then ended to first coil 32 and armature 35 remains in its first position as a result of residual flux in first coil 32 (See 4, FIG. 4*a*). When armature 35 moves to its first position, spool valve member 45 is pulled to its retracted position in a corresponding snap action manner (See 6, FIG. 4*b*). Actuation fluid passage 48 is now open to low pressure passage 44 via low pressure annulus 47. With low pressure acting on hydraulic surface 61, piston 60 and plunger 63 can move to their fully retracted positions under the force of biasing spring 64. When plunger 63 retracts, fuel is drawn into fuel pressurization chamber 65 via fuel inlet 67 past check valve 68.

Referring now to FIGS. 1 and 3, operation of dual solenoid actuator 130 will be disclosed for the present invention. Once again, it should be appreciated that dual solenoid actuator 130 could be positioned in a fuel injector 140, similar to fuel injector 40. Prior to an injection event, low pressure in fuel injector 140 prevails, piston 160 is in its upward position and both first solenoid coil 132 and second solenoid coil 139 are de-energized. Armature 135 is in its first position adjacent first coil 132 such that actuation fluid passage 148 is fluidly connected to low pressure passage 144 via low pressure recess 147 and annulus 149. Just prior to the injection event, second coil 139 is briefly energized and armature 135 is moved to its second position. Actuation fluid passage 148 is now blocked from low pressure passage 144 and open to high pressure passage 142 via high pressure annulus 146. High pressure can now act on piston 160 to move the same to its downward position, to begin pressurization of fuel within fuel injector 140. The fuel injection event can now occur, such as in the manner disclosed for fuel injector 40 above. Near the end of the injection event, first solenoid coil 132 is energized briefly to move armature 135 back to its first position blocking actuation fluid passage 148 from high pressure passage 142. Piston 160 can now return to its upward position, displacing actuation fluid from actuation fluid passage 148 through low pressure passage 144.

It should be appreciated that various modifications could be made to the present invention without departing from the spirit of the invention. For instance, fuel injector 40 could include a solitary actuator which is dual solenoid actuator 30. In this case, armature 35 could control the movement of at least one valve member that controls fluid flow to both actuation fluid passage 48 as well as to needle control chamber 71. The at least one valve member could be a single valve member capable of connecting these fluid passages to either high or low pressure. Conversely, the at least one valve member could be two valve members connected to armature 35 and arranged in series, with each valve member controlling fluid flow to one of actuation fluid passage 48 and needle control chamber 71. In addition, actuator 50 could be replaced by a second dual solenoid actuator to control fluid flow to needle control chamber 71. In both instances it should be appreciated that the snap action movement of the valve member controlling fluid flow to pressure communication passage 70 would create a more abrupt change in the pressure within needle control chamber 71. This would in turn result in a more abrupt end to the injection event.

In addition to these modifications, it should be appreciated that while the present invention has been illustrated including two current steering diodes positioned between the positive terminal and the two coils of the dual solenoid actuator, this too could be modified. For instance, the two diodes could be replaced by one or more alternative devices that perform the same function, such as another current steering mechanism, or one or more devices that restrict current flow to the respective solenoid coil to a level below a minimum threshold needed for activation. Additionally, the diodes, or other current restricting device(s), could be positioned between the negative terminal and the coils as opposed to the positioning that is illustrated. Further, in addition to the embodiments shown, it should be appreciated that the valve could be a two, three or even a four-way valve.

By utilizing the dual solenoid latching actuator of the present invention, the number of components of the electrical circuit can be reduced, in particular the number of communication lines needed to operate a dual solenoid actuator can be reduced, thus allowing the electric system to be more robust. In addition, use of the present invention can result in a more abrupt end to the injection event because flow of hydraulic fluid to the piston and plunger is controlled by the latching valve member.

Thus, those skilled in the art will appreciate that other aspects, objects and advantages of this invention can be obtained from a study of the drawings, the disclosure and the appended claims.

What is claimed is:

1. An actuator comprising:

a body;

a first solenoid coil and a second solenoid coil attached to said body;

an armature being movable between a first position adjacent said first solenoid coil and a second position adjacent said second solenoid coil;

an electrical circuit being electrically connected to said first solenoid coil and said second solenoid coil;

said electrical circuit including at least one current restrictor positioned and arranged such that current flowing in a first direction can energize only one of said first solenoid coil and said second solenoid coil and current flowing in a second direction can energize only an other of said first solenoid coil and said second solenoid coil;

wherein said armature moving from said first position to said second position when said second coil generates a magnetic flux sufficient to overcome a residual magnetic flux holding said armature in said first position; and wherein said armature moving from said second position to said first position when said first coil generates a magnetic flux sufficient to overcome a residual magnetic flux holding said armature in said second position.

2. The actuator of claim 1 wherein said electrical circuit includes a first terminal and a second terminal;

said at least one current restrictor includes a first diode positioned between said first solenoid coil and one of said first terminal and said second terminal;

said at least one current restrictor includes a second diode positioned between said second solenoid coil and one of said first terminal and said second terminal; and said first diode and said second diode being oriented in opposite directions.

3. The actuator of claim 1 wherein said first solenoid coil and said second solenoid coil are arranged in parallel.

4. The actuator of claim 1 wherein said electrical circuit is electrically connected to an electronic control module;

said electrical circuit having only a solitary oath to and from said first solenoid coil; and said electrical circuit having only a solitary path to and from said second solenoid coil.

5. The actuator of claim 1 wherein said armature is a valve member.

6. A valve comprising:

a valve body;

a first solenoid coil and a second solenoid coil being attached to said valve body;

an armature being movable between a first position adjacent said first solenoid coil and a second position adjacent said second solenoid coil;

an electrical circuit being electrically connected to said first solenoid coil and said second solenoid coil;

said electrical circuit including at least one current restrictor that is positioned and arranged such that current flowing in a first direction can energize only one of said first solenoid coil and said second solenoid coil and current flowing in a second direction can energize only an other of said first solenoid coil and said second solenoid coil;

said armature being moved from said second position to said first position when said first solenoid coil is energized to generate a magnetic flux sufficient to overcome a residual magnetic flux holding said armature in said second position; and said armature being moved from said first position to said second position when said second solenoid coil is energized to generate a magnetic flux sufficient to overcome a residual magnetic flux holding said armature in said first position.

7. The valve of claim 6 wherein a valve member is operably coupled to said armature.

8. The valve of claim 7 wherein said electrical circuit has only a solitary path to and from said first solenoid coil; and said electrical circuit has only a solitary path to and from said second solenoid coil.

9. The valve of claim 8 wherein said at least one current restrictor includes a first diode positioned between said first solenoid coil and said first terminal;

a second diode positioned between said second solenoid coil and said second terminal; and said first diode and said second diode being oriented in opposite directions.

10. The valve of claim 9 wherein said valve body defines a first fluid passage, a second fluid passage and a third fluid passage;

said third fluid passage is open to said first fluid passage when said valve member is in a retracted position; and said third fluid passage is open to said second fluid passage when said valve member is in an advanced position.

11. A valve comprising:

a valve body;

a first solenoid coil and a second solenoid coil being attached to said valve body;

an armature being movable between said first solenoid coil and said second solenoid coil;

an electrical circuit being electrically connected to said first solenoid coil and said second solenoid coil;

said electrical circuit including at least one current restrictor that is positioned and arranged such that current flowing in a first direction can energize only one of said first solenoid coil and said second solenoid coil and current flowing in a second direction can energize only an other of said first solenoid coil and said second solenoid coil;

said armature being moved to a first position adjacent said first solenoid coil when said first solenoid coil is energized;

said armature being moved to a second position adjacent said second solenoid coil when said second solenoid coil is energized;

a valve member is operably coupled to said armature;

said electrical circuit includes a solitary first communication line operably connecting a first terminal to said first solenoid coil and said second solenoid coil;

a solitary second communication line operably connecting a second terminal to said first solenoid coil and said second solenoid coil;

said at least one current restrictor includes a first diode positioned between said first solenoid coil and said first terminal;

a second diode positioned between said second solenoid coil and said second terminal;

said first diode and said second diode being oriented in opposite directions;

said valve body defines a first fluid passage, a second fluid passage and a third fluid passage;

said third fluid passage is open to said first fluid passage when said valve member is in a retracted position; and said third fluid passage is open to said second fluid passage when said valve member is in an advanced position;

said first fluid passage is a high pressure passage fluidly connected to a high pressure source;

said second fluid passage is a low pressure passage fluidly connected to a low pressure reservoir; and said third fluid passage is an actuation fluid passage.

12. The valve of claim 11 wherein said valve is a portion of a hydraulic device.

13. The valve of claim 12 wherein said hydraulic device is a hydraulically actuated fuel injector.

14. The valve of claim 13 wherein said valve member is hydraulically balanced.

15. The valve of claim 14 wherein said hydraulically actuated fuel injector includes a needle valve member having a closing hydraulic surface exposed to fluid pressure in a needle control chamber.

16. A method of controlling a valve comprising:

providing a valve assembly including a first solenoid coil, a second solenoid coil and a valve member operably coupled to an armature;

electrically connecting said first solenoid coil and said second solenoid coil to an electrical circuit;

moving said valve member from a second position to a first position, at least in part by energizing said first solenoid coil and preventing energization of said second solenoid coil such that magnetic flux generated by the energized coil overcomes a residual magnetic flux holding the armature adjacent the unenergized coil; and moving said valve member from said first position to said second position, at least in part by energizing said second solenoid coil and preventing energization of said first solenoid coil such that magnetic flux generated by the energized coil overcomes a residual magnetic flux holding the armature adjacent the unenergized coil.

17. The method of claim 16 wherein said step of electrically connecting includes the steps of electrically connecting said first solenoid coil and said second solenoid coil to a positive terminal via respective solitary electrical paths; and electrically connecting said first solenoid coil and said second solenoid coil to a negative terminal via respective solitary electrical paths.

18. The method of claim 16 including the steps of positioning a first diode between said positive terminal and said first solenoid coil and a second diode between said positive terminal and said second solenoid coil; and orienting said second diode in an opposite direction from said first diode.

19. The method of claim 16 including the step of arranging said first solenoid coil and said second solenoid coil in parallel.

20. The method of claim 16 wherein said step of moving said valve member to said first position includes a step of allowing current flow a first direction while preventing current flow through said second solenoid coil; and said step of moving said valve member to said second position includes a step of allowing current flow in a second direction while preventing current flow through said first solenoid coil, wherein said second direction is in opposition to said first direction.

* * * * *